United States Patent
Flamary-Mespoulie et al.

(10) Patent No.: US 12,054,421 B2
(45) Date of Patent: Aug. 6, 2024

(54) METHOD FOR PRODUCING A CURVED LAMINATED GLAZING

(71) Applicant: SAINT-GOBAIN GLASS FRANCE, Courbevoie (FR)

(72) Inventors: Florian Flamary-Mespoulie, Compiegne (FR); Juliette Jamart, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/257,482

(22) PCT Filed: Dec. 14, 2021

(86) PCT No.: PCT/FR2021/052313
§ 371 (c)(1),
(2) Date: Jun. 14, 2023

(87) PCT Pub. No.: WO2022/129769
PCT Pub. Date: Jun. 23, 2022

(65) Prior Publication Data
US 2023/0399257 A1   Dec. 14, 2023

(30) Foreign Application Priority Data
Dec. 17, 2020   (FR) ...................... 2013515

(51) Int. Cl.
*C03C 17/36* (2006.01)
*B32B 17/10* (2006.01)
*C03B 23/023* (2006.01)

(52) U.S. Cl.
CPC .... *C03C 17/3681* (2013.01); *B32B 17/10036* (2013.01); *B32B 17/10229* (2013.01);
(Continued)

(58) Field of Classification Search
CPC ............ C03C 17/3681; C03C 17/3626; C03C 17/3644; C03C 17/3649; C03C 17/3655;
(Continued)

(56) References Cited

U.S. PATENT DOCUMENTS 5,677,064 A * 10/1997 Boaz ..................... C03C 17/007
  428/404
6,063,712 A *  5/2000 Gilton ............... H01L 21/31111
  216/101
(Continued)

FOREIGN PATENT DOCUMENTS

CN        102424529 A  *  4/2012
WO        WO 00/29346 A1    5/2000
(Continued)

OTHER PUBLICATIONS

JR International Search Report as issued in International Patent Application No. PCT/FR2021/052313, dated Apr. 26, 2022.
(Continued)

*Primary Examiner* — Christopher W Raimund
(74) *Attorney, Agent, or Firm* — Pillsbury Winthrop Shaw Pittman LLP

(57) ABSTRACT

A method for producing a curved laminated glazing, for a windscreen or roof of a motor vehicle includes providing a first glass sheet, coated on at least one part of one of its faces with a stack of thin layers, depositing, on one part of the surface of the stack of thin layers in a zone to be cleared, a washable dissolving layer, a pre-firing after which the stack of thin layers located under the washable dissolving layer is dissolved by the washable dissolving layer, creating a cleared zone, the removal of the washable dissolving layer by washing, the deposit, at least on one part of the cleared zone, of an opaque mineral layer, the curving of the first glass sheet and of an additional glass sheet, together or
(Continued)

separately, and the laminating of the first glass sheet with an additional glass sheet using a lamination interlayer.

19 Claims, 3 Drawing Sheets

(52) U.S. Cl.
CPC .... *B32B 17/10348* (2013.01); *B32B 17/1044* (2013.01); *B32B 17/10761* (2013.01); *B32B 17/10889* (2013.01); *B32B 17/10935* (2013.01); *C03B 23/023* (2013.01); *C03C 17/3626* (2013.01); *C03C 17/3644* (2013.01); *C03C 17/3649* (2013.01); *C03C 17/3655* (2013.01); *C03C 17/366* (2013.01); *B32B 2250/40* (2013.01); *B32B 2255/205* (2013.01); *B32B 2255/28* (2013.01); *B32B 2307/41* (2013.01); *B32B 2311/08* (2013.01); *B32B 2311/22* (2013.01); *B32B 2315/08* (2013.01); *B32B 2318/00* (2013.01); *B32B 2329/06* (2013.01); *B32B 2605/006* (2013.01); *B32B 2605/08* (2013.01); *C03C 2217/944* (2013.01); *C03C 2217/948* (2013.01); *C03C 2218/119* (2013.01); *C03C 2218/31* (2013.01); *C03C 2218/328* (2013.01); *C03C 2218/355* (2013.01)

(58) Field of Classification Search
CPC ............ C03C 17/366; C03C 2217/944; C03C 2217/948; C03C 2218/119; C03C 2218/31; C03C 2218/328; C03C 2218/355; B32B 17/10036; B32B 17/10229; B32B 17/10348; B32B 17/1044; B32B 17/10761; B32B 17/10889; B32B 17/10935; B32B 2250/40; B32B 2255/205; B32B 2255/28; B32B 2307/41; B32B 2311/08; B32B 2311/22; B32B 2315/08; B32B 2318/00; B32B 2329/06; B32B 2605/006; B32B 2605/08; C03B 23/023
See application file for complete search history.

(56) References Cited

U.S. PATENT DOCUMENTS

| | | | |
|---|---|---|---|
| 2008/0200036 A1* | 8/2008 | Stockum | C03C 15/00 216/13 |
| 2008/0210298 A1* | 9/2008 | Kuebelbeck | C03C 17/3411 252/79.2 |
| 2015/0376935 A1* | 12/2015 | Greiner | E06B 3/6722 65/41 |
| 2020/0055285 A1* | 2/2020 | Compoint | B32B 17/10036 |

FOREIGN PATENT DOCUMENTS

| WO | WO 2014/133929 A2 | 9/2014 | |
|---|---|---|---|
| WO | WO-2018178547 A1 * | 10/2018 | ....... B32B 17/10036 |
| WO | WO 2019/106264 A1 | 6/2019 | |
| WO | WO 2020/020671 A1 | 1/2020 | |
| WO | WO 2020/169732 A1 | 8/2020 | |

OTHER PUBLICATIONS

Written Opinion of the International Searching Authority as issued in International Patent Application No. PCT/FR2021/052313, dated Apr. 26, 2022.

* cited by examiner

[Fig.1]
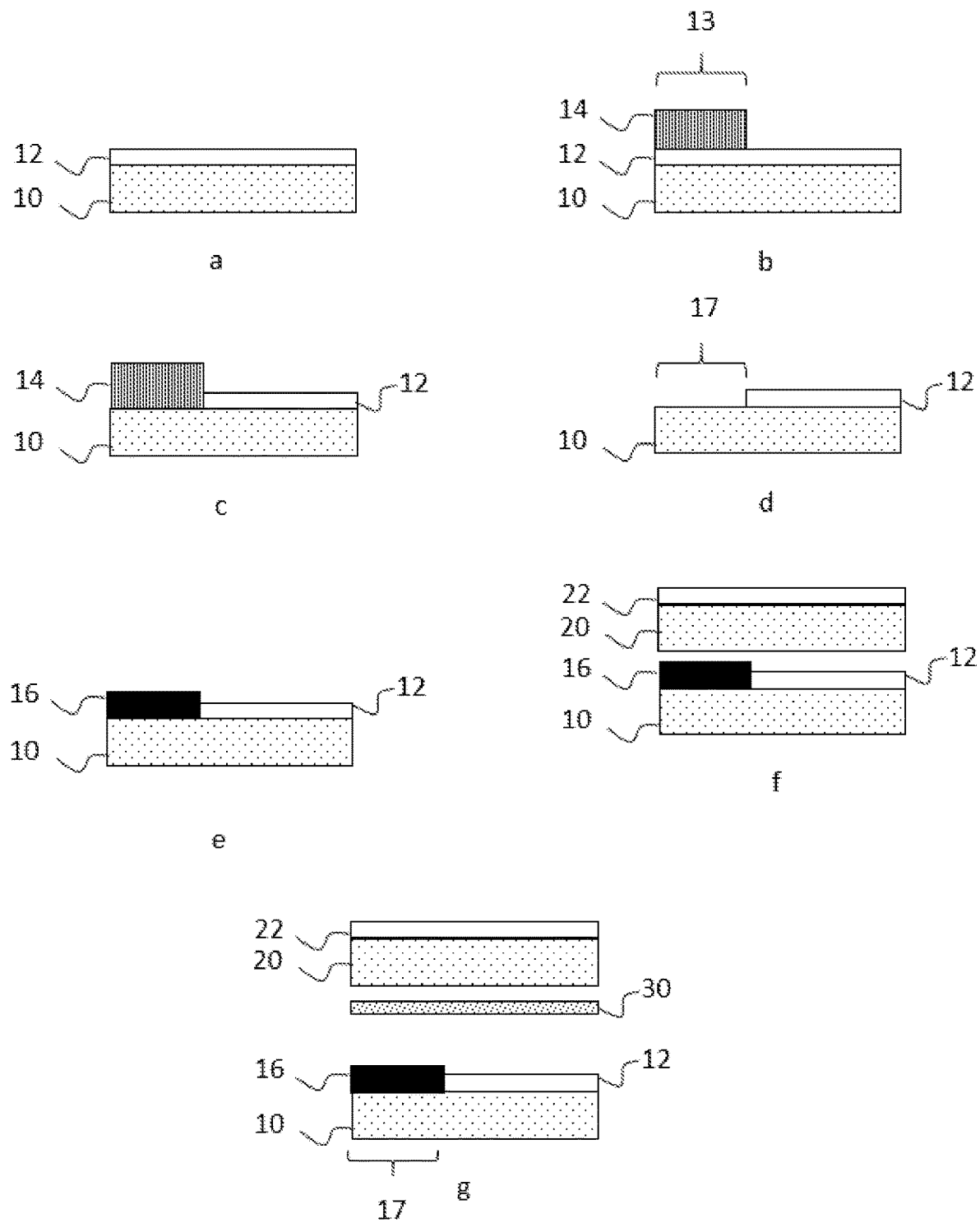

[Fig.2]
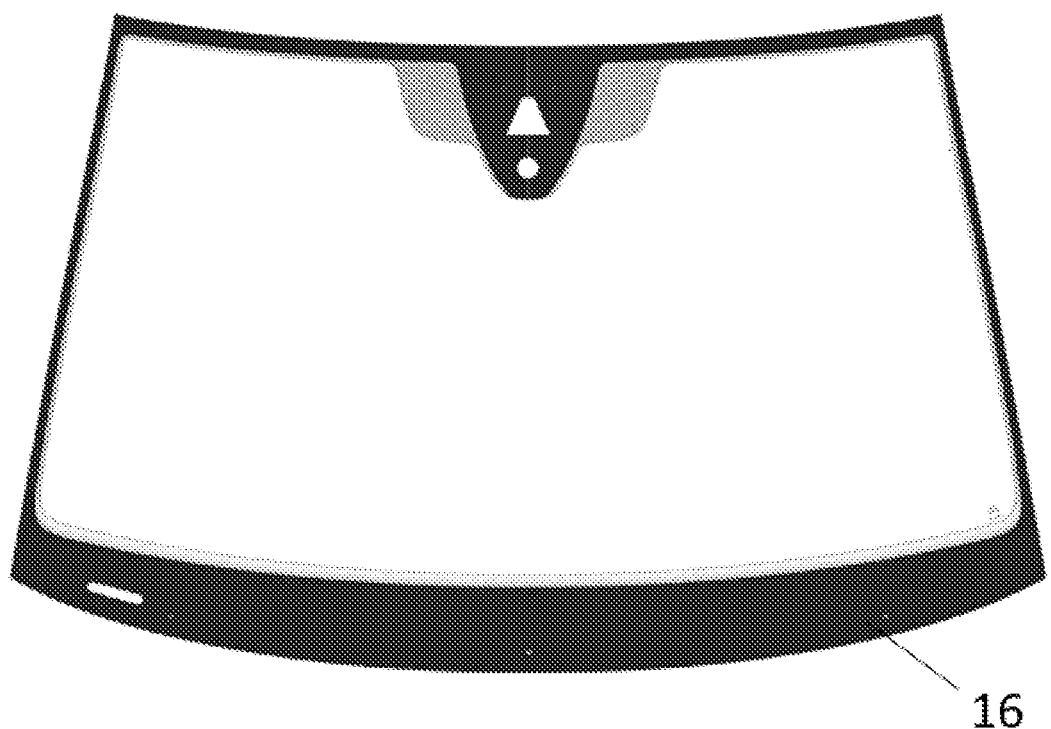
[Fig.3]
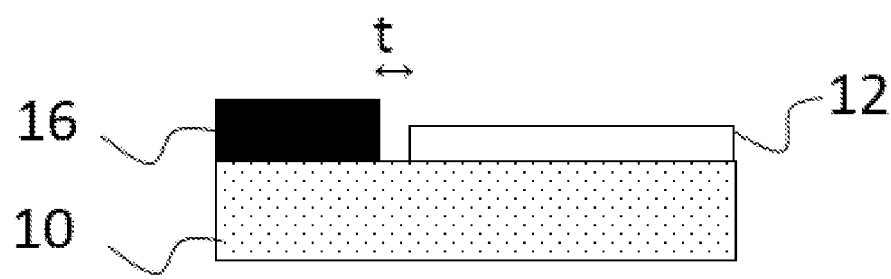

[Fig.4]
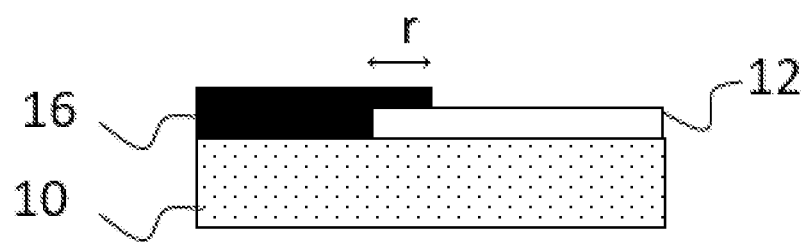
[Fig.5]
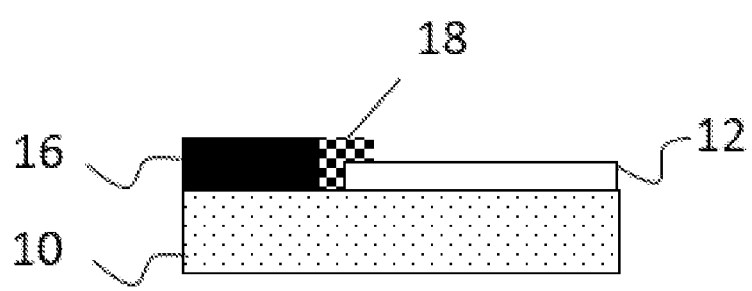

METHOD FOR PRODUCING A CURVED LAMINATED GLAZING

CROSS-REFERENCE TO RELATED APPLICATIONS

This application is the U.S. National Stage of PCT/FR2021/052313, filed Dec. 14, 2021, which in turn claims priority to French patent application number 2013515 filed Dec. 17, 2020. The content of these applications are incorporated herein by reference in their entireties.

The invention relates to the domain of curved laminated glazings for motor vehicles, for example for roofs or windscreen, comprising a glass sheet coated with a stack of thin layers.

Laminated glazings are glazings wherein two glass sheets are bonded adhesively using a lamination interlayer. The latter may particularly retain glass splinters in the event of breakage, but also provides other functionalities, particularly in terms of resistance to breakage or improved acoustic properties.

This glazing classically comprises an opaque zone, generally black, usually in the form of a peripheral strip intended to mask and protect from ultraviolet radiation the polymer joints that affix and position the glazing in the car body. Opaque zones also mask the fixation zones for the interior rear view mirror and various connectors and sensors.

These opaque zones are often obtained by depositing layers of enamel. In a laminated glazing, these layers of enamel are generally arranged on face 2, the faces traditionally being numbered from the face intended to be positioned on the vehicle's exterior. Face 2 is therefore a face which is in contact with the lamination interlayer. Enamel is generally obtained by firing a composition comprising a glass frit and pigments at above 500° C. A glass frit is composed of fine particles of glass with a low melting point which, under the effect of a firing heat treatment, softens and adheres to the glass sheet. A mineral layer, generally opaque, is thereby formed, with high chemical and mechanical strength, adhering perfectly to the glass while holding the pigment particles. The firing step is generally achieved simultaneously with the curving of the glass sheet.

In the context of the production of laminated glazing, the two glass sheets of the glazing are often curved together, the glass sheet intended to be positioned in the vehicle's interior generally being arranged above the other glass sheet, which carries the enamel. It is then necessary that the enamel has anti-adhesive properties to prevent any adhesion between the two glass sheets during the curving. To do this, usually enamels containing bismuth are used, that is obtained from glass frits containing bismuth oxide.

Coatings, generally in the form of stacks of thin layers, may also be present on at least one of the glass sheets of the laminated glazing. It can in particular be electroconducting layers, which can provide two types of functionality. The electroconducting layers can on the one hand, when the provision of current is planned, dissipate heat through the Joule effect. This is layers for heating, useful for example for defrosting or defogging. On the other hand, these layers have, due to their reflection of infrared radiation, properties of sun control or low emissivity. The layers are valued for the improvement of thermal comfort or energy savings they provide, while reducing the consumption intended for heating or air conditioning. These stacks of layers are generally arranged on face 3 of the laminated glazing, therefore also in contact with the lamination interlayer.

It can however be interesting, in some cases that will be described in what follows, to arrange the layer of enamel and the stack of thin layers on the same glass sheet, and therefore on the same face of the glass sheet in question so that these coatings are protected on the inside of the laminated glazing.

However it has been observed that when a glass sheet coated with a stack of thin layers had to be provided with a layer of enamel, undesirable interactions could occur while the curving occurs between the stack and the enamel, leading in particular to degradation in the aesthetic appearance of the enamel. It has in particular been observed, particularly when the stack contained at least one layer of nitride and the enamel contained bismuth, that bubbles formed within the enamel, near the interface between it and the stack, causing a significant drop in the enamel adhesion, changing its optical appearance (particularly the color on the glass side, that is on the side opposite the enamel) and reducing its chemical resistance, particularly its acid-resistance.

The aesthetic appearance of the opaque zone seen from the outside of the vehicle holds special importance for automotive manufacturers. And the aforementioned interactions lead to an undesirable grayish shade.

Several solutions to this problem have been proposed.

It is possible to remove the stack of thin layers in advance at the places where the layer of enamel must be deposited, for example using abrasives, so that the enamel is deposited in direct contact with the glass sheet and to prevent all interaction problems between the enamel layer and the stack of thin layers. This clearing by mechanical abrasion generates visible scratches though, including in the enamel layer.

Application WO 2014/133929, and before it application WO0029346, proposed the idea of using for the enamel special glass frits that can, during firing or pre-firing, dissolve the stack of thin layers to directly attach to the glass. However these enamels do not have good antiadhesive properties, and during the bending cause the two glass sheets to adhere together.

Application WO 2019/106264 proposes modifying the stack of thin layers by adding a layer of oxide between the stack and the enamel comprising bismuth. However, it is not always possible to make such a change.

The purpose of the invention is to remedy these drawbacks by proposing another way of obtaining a laminated glazing comprising a stack of thin layers and an opaque zone having the desired reflection appearance.

To achieve this, the invention relates to a method of obtaining a curved laminated glazing, in particular for windshields or roofs of automotive vehicles, comprising the following steps:

a. the provision of a first glass sheet, coated on at least one part of one of its faces of a stack of thin layers, b. a step of depositing, on one part of the surface of the stack of thin layers, in a zone called "glass sheet zone to be cleared", a washable dissolving layer, c. a step of pre-firing after which the stack of thin layers located under the washable dissolving layer is dissolved by said washable dissolving layer, d. a step of removing the washable dissolving layer by washing, creating a cleared zone, e. a step of depositing, at least on one part of the cleared zone, an opaque mineral layer, f. a step of curving the first glass sheet and an additional glass sheet, together or separately, g. a step of laminating said first glass sheet with the additional glass sheet using a lamination interlayer, the stack of thin layers being turned towards the lamination interlayer.

The invention also relates to a curved laminated glazing, in particular a windshield or roof of a motor vehicle, comprising a first glass sheet coated on at least one part of one of its faces, with the exception of a cleared zone, with a stack of thin layers, and coated at least on one part of said cleared zone with an opaque mineral layer, said first glass sheet being laminated with an additional glass sheet using a lamination interlayer, the stack of thin layers being turned towards said lamination interlayer. Such a glazing is specifically obtained or likely to be obtained by the method according to the invention.

The replacement of the enamel by an opaque zone formed on the lamination interlayer and the removal of the stack of thin layers in terms of this opaque zone make it possible to avoid the aforementioned undesirable interactions and to ensure perfect appearance. In the context of the present invention, the adjective "opaque" is understood as related to visible radiation.

Step a

The first glass sheet may be flat or curved. The first glass sheet is generally flat when the stack of thin layers then the washable dissolving layer are deposited, and is then curved during step f. The first glass sheet is therefore curved in the curved laminated glazing according to the invention.

The glass of the first glass sheet is typically a silico-sodo-calcium glass, but other glasses, for example borosilicates or aluminosilicates, may also be used. The first glass sheet is preferably obtained by the float method, that is by a method consisting of pouring molten glass onto a bath of molten tin.

The first glass sheet may be made of clear glass or tinted glass, preferably of tinted glass, for example green, gray or blue. To this end, the chemical composition of the first glass sheet advantageously comprises iron oxide, in a content by weight ranging from 0.5 to 2%. It may also comprise other coloring agents, such as cobalt oxide, chromium oxide, nickel oxide, erbium oxide or else selenium.

The first glass sheet preferably has a thickness comprised in a domain ranging from 0.7 to 19 mm, in particular from 1 to 10 mm, particularly from 2 to 6 mm, even from 2 to 4 mm.

The lateral dimensions of the first glass sheet (and of the additional glass sheet) are to be adapted according to those of the laminated glazing to which they are intended to be integrated. The first glass sheet (and/or the additional glass sheet) preferably have a surface area of at least 1 $m^2$.

During step a, the first glass sheet is preferably coated with the stack of thin layers on at least 70%, in particular on at least 90%, even on the entire surface area of the face of the glass sheet. Some zones may in fact not be coated so as to arrange communication windows allowing waves to pass.

The stack of thin layers is preferably in contact with the interior glass sheet. When being deposited, the washable dissolving layer is preferably in contact with the stack of thin layers.

In the present text, "contact" is intended to mean physical contact. The expression "based on" is preferably intended to mean the fact that the layer in question comprises at least 50% by weight of the material in question, particularly 60%, or even 70% and even 80% or 90%. The layer may even substantially consist of, or consist of, this material. "Substantially consist of" should be understood to mean that the layer may comprise impurities which have no influence on its properties. The terms "oxide" or "nitride" do not necessarily mean that the oxides or nitrides are stoichiometric. Indeed, they may be substoichiometric, superstoichiometric or stoichiometric.

The stack preferably comprises at least one layer based on a nitride. The nitride is particularly a nitride of at least one element selected from aluminum, silicon, zirconium, titanium. It may comprise a nitride of at least two or three of these elements, for example a silicon zirconium nitride or a silicon aluminum nitride. The layer based on a nitride is preferably a layer based on silicon nitride, more particularly a layer consisting substantially of a silicon nitride. When the layer of silicon nitride is deposited by cathode sputtering, it generally contains aluminum because it is common practice to dope silicon targets with aluminum in order to accelerate the deposition rates.

The layer based on a nitride preferably has a physical thickness in a range extending from 2 to 100 nm, particularly from 5 to 80 nm.

The layers based on nitride are commonly used in a large number of stacks of thin layers since they have advantageous blocking properties, in that they prevent the oxidation of other layers present in the stack, particularly functional layers which will be described below.

The stack preferably comprises at least one functional layer, particularly an electrically conductive functional layer. The functional layer is preferably included between two thin dielectric layers, at least one of which is a layer based on nitride. Other possible dielectric layers are for example layers of oxides or oxynitrides.

At least one electrically conductive functional layer is advantageously selected from:
  metal layers, particularly silver, niobium, or gold layers, and
  layers of a transparent conductive oxide, particularly selected from indium tin oxide, doped tin oxides (for example doped with fluorine or antimony), doped zinc oxides (for example doped with aluminum or gallium).

These layers are particularly valued for their low emissivity, which gives the glazings excellent thermal insulation properties. In glazings equipping land vehicles, in particular motor vehicles, trains, and also aircraft or seafaring vessels, low-emissivity glazings make it possible, in hot weather, to outwardly reflect part of the solar radiation, and therefore to limit the heating of the passenger compartment of said vehicles, and where appropriate to reduce air-conditioning costs. Conversely, in cold weather, these glazings make it possible to retain the heat within the passenger compartment, and consequently to reduce the heating energy required.

According to a preferred embodiment, the stack of thin layers comprises at least one layer of silver, particularly one, two, three, or even four layers of silver. The physical thickness of the layer of silver or, where appropriate, the sum of the thickness of the layers of silver, is preferably between 2 and 20 nm, particularly between 3 and 15 nm.

According to another embodiment, the stack of thin layers comprises at least one layer of indium and tin oxide. The physical thickness thereof is preferably between 30 and 200 nm, in particular between 40 and 150 nm.

In order to protect the or each electrically conductive thin layer (whether metallic or based on transparent conductive oxide) during the bending step, each of these layers is preferably surrounded by at least two dielectric layers. The dielectric layers are preferably based on oxide, nitride and/or oxynitride of at least one element selected from silicon, aluminum, titanium, zinc, zirconium, tin.

At least part of the stack of thin layers can be deposited by various known techniques, for example chemical vapor deposition (CVD), or by cathode sputtering, particularly magnetic-field-assisted (magnetron method).

The stack of thin layers is preferably deposited by cathode sputtering, particularly magnetron sputtering. In this method, a plasma is created in a high vacuum close to a target comprising the chemical elements to be deposited. By bombarding the target, the active species of the plasma tear off said elements, which are deposited on the glass sheet, forming the desired thin layer. This method is called a "reactive" method when the layer is made of a material resulting from a chemical reaction between the elements torn off from the target and the gas contained in the plasma. The major advantage of this method lies in the possibility of depositing a very complex stack of layers on the same line by making the glass sheet run in succession beneath various targets, generally in the same device.

The abovementioned examples have properties of electrical conduction and infrared reflection which are of use for providing a heating function (defrosting, defogging) and/or a thermal insulation function.

When the stack of thin layers is intended to provide a heating function, supplies of current must be provided. This may particularly be strips of silver paste deposited by screen printing on the stack of thin layers, at two opposite edges of the glass sheet. These bands will be hidden by the opaque mineral layer in the final glazing.

Step b

The stack is preferably coated by the washable dissolving layer over 2 to 35%, particularly 3 to 25%, more particularly 4 to 20% and even 5 to 15% of the surface thereof. The zone to be cleared (and eventually the cleared zone) forms preferably a peripheral strip, that is a self-contained strip which, at any point of the periphery of the exterior glass sheet, extends toward the interior of the first glass sheet over a certain width, typically of between 1 and 20 cm. The width can vary according to the position of the point considered.

During step b, the washable dissolving layer is preferably deposited from a liquid composition, in particular a liquid or a paste. The washable dissolving layer is preferably deposited by screen printing. To this end, a screen printing screen is placed on the glass sheet, which screen comprises meshes, some of which are blocked off, then the enamel composition is deposited on the screen, then a squeegee is applied in order to force the enamel composition through the screen in the zones where the screen meshes have not been blocked off, so as to form a washable dissolving layer.

The thickness of the washable dissolving layer is preferably comprised between 5 and 50 µm, in particular between 10 and 40 µm, even between 15 and 30 µm.

Step b is preferably immediately followed by a drying step, intended to remove at least part of the solvent contained in the fluid composition. Such drying is typically carried out at a temperature of between 120 and 180° C.

The washable dissolving layer is preferably a mineral layer comprising at least one phosphate. The phosphate is particularly an alkaline phosphate, preferably a sodium phosphate. The term "phosphate" is also understood to mean hydrogenphosphates and dihydrogenphosphates. The generic term sodium phosphate therefore also covers sodium hydrogenphosphate $Na_2HPO_4$, sodium dihydrogenphosphate $NaH_2PO_4$, and trisodium phosphate $Na_3PO_4$, and mixtures of these compounds.

The fluid composition preferably comprises a solvent, especially an organic solvent, and a resin. The quantities of solvent and resin regulate the viscosity of the composition, and are to be adapted according to the method of application used.

Step c

The pre-firing step is preferably carried out at a temperature comprised between 150 and 700° C., particularly between 550 and 700° C.

Such a pre-firing removes the organic medium, or more generally any organic component, that may be present in the washable dissolving layer.

During the pre-firing, the stack of thin layers is dissolved by the washable dissolving layer. The dissolution of the stack can be observed by electron microscopy.

Step d

The step of removing the washable dissolving layer makes it possible to remove it by means of washing.

In the cleared zone, the surface of the glass is therefore bare after this step, since it is no longer coated, neither by the stack of thin layers nor by the washable dissolving layer.

The washing is preferably carried out by spraying pressurized water or by means of a washing machine provided with brushes. The brushes must be soft so as not to damage the stack of thin layers.

Step e

In this step, an opaque mineral layer is deposited, at least on one part of the cleared zone.

The opaque mineral layer is preferably black. The reflection clarity $L^*$ on the glass side (illuminant D65, reference observer 10°) is preferably less than or equal to 10, in particular to 5, even to 3.

The opaque mineral layer forms on the first glass sheet an opaque zone, the remainder forming a transparent zone. The opaque zone represents preferably from 2 to 35%, in particular from 3 to 25%, even from 4 to 20% and even from 5 to 15% of the surface are of the first glass sheet.

Preferably, the cleared zone and the opaque mineral layer (or the opaque zone) form a strip around the periphery of the first glass sheet.

These two zones may not perfectly and exactly correspond to each other, because of the size tolerances of the deposit techniques used. There may for example exist a light coverage between the opaque zone and the zones coated by the stack, or on the contrary, a space of bare glass between the opaque zone and the zone coated by the stack. The coverage, or the space of bare glass, is preferably less than 1 mm, in particular than 0.5 mm. To make less perceptible any appearance defects due to these relative positions that are not an exact match, a decoration, for example based upon dots—such as a graded dotted pattern, can be printed in this area.

According to one embodiment, the deposit of the opaque mineral layer is made by depositing an enamel composition comprising a glass frit and pigments. An enamel coating is then formed.

The enamel composition preferably comprises an organic medium. The latter is removed during the curving step, which allows the consolidation of the enamel coating, even if needed during a pre-firing treatment of the enamel. After firing, the enamel coating therefore comprises pigments in an essentially vitreous or vitro-crystalline matrix.

The glass frit or the vitreous matrix is preferably based of a bismuth and/or zinc borosilicate. Bismuth borosilicates are preferred because they have better acid-resistance.

According to one variant, the enamel is capable of dissolving at least partially a stack of underlying thin layers, during the curving or any pre-firing. In this case the glass frit is preferentially based on bismuth borosilicate, even based on bismuth and zinc borosilicate. To make it more "aggressive" with respect to the stack of layers and favor the dissolution thereof, the bismuth and/or boron contents are preferably higher than those of the glass frits typically used. This variant is interesting for ensuring perfect correspondence between the opaque zone and the zone coated by the stack, since in the case of overlap at the moment of the deposit (avoiding any bare glass area), the part of the enamel coating located above the stack of thin layers will be capable of dissolving the latter and therefore of making it disappear.

The thickness of the enamel coating, after the heat treatment step, is preferably within a range extending from 5 to 50 µm, in particular from 10 to µm.

According to another embodiment, the deposit of the opaque mineral layer is achieved by depositing an aqueous paint composition comprising pigments and an aqueous solution of alkaline silicate. This forms a layer of mineral paint called "silicate paint".

The aqueous solution of alkali metal silicate preferably comprises at least one sodium, potassium and/or lithium silicate. The aqueous solution of alkaline silicate may consist of a mixture of aqueous solutions of different alkaline silicates, for example a mixture of at least one aqueous solution of sodium and at least one aqueous solution of potassium.

The paint composition preferably comprises at least one mineral filler, in particular chosen from colloidal silica, feldspars, alumina and lamellar fillers. The lamellar fillers are preferably chosen from among talc, mica and clays, in particular clays based on silicate or aluminosilicate such as kaolinite, illinite, montmorillonite and sepiolite. The paint composition advantageously comprises a mixture of several mineral fillers.

The mineral fillers and the pigments preferably have a particle size distribution (by volume) such that the d90 thereof is less than 10 µm.

The paint composition may also comprise a base, in particular an alkaline hydroxide.

The paint composition may additionally contain various additives, such as at least one dispersant, at least one anti-foaming agent, at least one thickening agent, at least one stabilizing agent and/or at least one hardening agent.

In the layer of mineral paint, the weight content of alkaline silicate is preferably comprised between 7% and 60%, in particular between 15 and 55%. The total weight content of pigments and mineral fillers is preferably comprised between 20 and 90%, in particular between 30 and 70%. The total content of additives is preferably comprised between 0.1 and 5%. These contents apply also for the aqueous paint composition (in that case it is a percentage relative to the dry extract).

The final layer of mineral paint (after firing) therefore comprises alkaline silicate and pigments, and if need be mineral fillers.

The thickness of the layer of mineral paint is preferably comprised between 2 and 20 µm, in particular between 3 and 15 µm, or even between 4 and 10 µm. Here, this is the thickness of the final layer, after curving.

In the two embodiments above, the pigments preferably comprise one or more oxides selected from chromium, copper, iron, manganese, cobalt and nickel oxides. These may be, by way of example, copper and/or iron chromates.

The step of depositing the layer of mineral paint and/or enamel coating is preferably achieved by screen printing. Screen printing comprises the deposit, in particular using a squeegee, of a liquid composition on the glass sheet through meshes of a screen printing screen. The meshes of the screen are blocked in the part corresponding to the zones of the glass sheet that are not to be coated, such that the liquid composition can only pass through the screen in the zones to be printed, according to a predefined design. Other deposit techniques such as digital printing techniques are also possible.

Step e can be followed by a pre-firing step e1.

In the case of a layer of mineral paint, the pre-firing is intended to harden the layer of paint before the curving step. The mineral paints based on alkaline silicates can usually be hardened at moderate temperatures, of the order of 200 to 250° C. The pre-firing step is typically achieved in a radiation oven or a convection oven. The pre-firing time is preferably between 60 and 1000 seconds, in particular between 100 and 600 seconds, or even between 120 and 500 seconds. A simple drying, in particular between 120 and 180° C., may show itself to be sufficient.

In the case of an enamel coating, the pre-firing uses temperatures preferably comprised between 550 and 650° C., in particular between 560 and 600° C. The pre-firing treatment is particularly useful for developing the anti-adhesion properties of certain enamels.

Step f

Bending can be carried out using gravity, for example (the glass deforms under its own weight) or through pressing, at temperatures typically ranging from 550 to 650° C.

According to a first embodiment, the two glass sheets (first glass sheet and additional glass sheet) are curved separately.

According to a second embodiment, the first glass sheet and the additional glass sheet are curved separately. The glass sheets are preferably kept apart by placing an interlayer powder between them to ensure a gap of a few tens of micrometers, typically 20 to 50 µm. The interlayer powder is for example based on calcium and/or magnesium carbonate. During the bending, the inner glass sheet (intended to be positioned inside the passenger compartment) is normally placed above the exterior glass sheet. Accordingly, during the curving step, the additional glass sheet will generally be placed above the first glass sheet.

Step g

The lamination interlayer preferably comprises at least one sheet of polyvinyl acetal, particularly polyvinyl butyral (PVB).

The lamination interlayer may be tinted or untinted in order, if necessary, to regulate the optical or thermal properties of the glazing.

The lamination interlayer may advantageously have acoustic absorption properties in order to absorb airborne or structure-borne sounds. To this end, it may particularly consist of three polymeric sheets, including two "external" PVB sheets surrounding an internal polymeric sheet, optionally made of PVB, with a lower hardness than that of the external sheets.

The lamination interlayer may also have thermal insulation properties, in particular properties of infrared radiation reflection. To this end, it may comprise a coating of thin layers with low-emissivity, for example a coating comprising a thin layer of silver or a coating alternating dielectric layers with different refractive indices, deposited on an internal PET sheet surrounded by two external PVB sheets.

The thickness of the lamination interlayer is generally within a range extending from 0.3 to 1.5 mm, particularly from 0.5 to 1 mm. The lamination interlayer can have a smaller thickness on an edge of the glazing than at the center of the glazing in order to prevent the formation of a double image in the case of using a head-up display (HUD).

The step of lamination may be carried out by treatment in an autoclave, for example at temperatures from 110 to 160° C. and under a pressure ranging from 10 to 15 bar. Prior to the autoclave treatment, the air trapped between the glass sheets and the lamination interlayer can be eliminated by calendering or by applying negative pressure.

The additional sheet is preferably the inner sheet of the laminated glazing, that is, the sheet located on the concave side of the glazing, intended to be positioned inside the passenger compartment of the vehicle. In this way, the stack of thin layers is arranged on face 2 of the laminated glazing.

The additional glass sheet may be made of silico-sodo-calcium glass, or of borosilicate or aluminosilicate glass. It may be made of clear or tinted glass. Its thickness is preferably between 0.5 and 4 mm, particularly between 1 and 3 mm.

According to a preferred embodiment, the additional glass sheet has a thickness comprised between 0.5 and 1.2 mm. The additional glass sheet is in particular made of sodium aluminosilicate glass, preferably strengthened chemically. The additional glass sheet is preferably the inner sheet of the laminated glazing. The invention is particularly useful for this type of configuration, for which it is difficult to arrange the stack of thin layers on face 3. Chemical strengthening (also called "ion exchange") consists in putting into contact the glass surface with a molten potassium salt (for example potassium nitrate), so as to strengthen the surface of the glass by exchanging ions of the glass (here sodium ions) with ions with a larger ionic radius (here potassium ions). This ion exchange allows compression stresses to form on the surface of the glass and over a certain thickness. Preferably, the surface stress is at least 300 MPa, in particular 400 and even 500 MPa, and at most 700 MPa, and the thickness of the compression zone is at least 20 μm, typically between and 50 μm. The stress profile can be determined in a known manner using a polarizing microscope equipped with a Babinet compensator. The step of chemical tempering is preferably achieved at a temperature ranging from 380 to 550° C., and for a duration ranging from 30 minutes to 3 hours. The chemical strengthening is preferably achieved after the curving step but before the lamination step. The glazing obtained is preferably a motor vehicle windshield, particularly a heated windshield.

According to another preferred embodiment, the additional glass sheet bears on the face opposite the face turned towards the lamination interlayer (preferably face 4, the additional sheet being the inner sheet) a stack of additional thin layers, in particular a stack with low emissivity, comprising a transparent conductive oxide, in particular indium and tin oxide (ITO). The invention is also particularly useful for this type of configuration, for which it is delicate to arrange stacks of thin layers onto the two faces of the same glass sheet (face 3 and 4). In this embodiment, the lamination interlayer and/or the additional glass sheet is preferably tinted, where the glass sheet bearing the coatings can be made of clear glass. The glazing obtained is preferably a motor vehicle roof.

As an example of the latter preferred embodiment, we can cite a curved laminated roof comprising, from the outside of the vehicle, a clear glass sheet coated on face 2 of a stack of thin layers comprising at least one layer of silver, a lamination interlayer made of tinted PVB, and an additional glass sheet made of tinted glass, bearing on face 4 a stack of thin layers with low emissivity, in particular made of ITO.

EXAMPLES

The following exemplary embodiments illustrate the invention in a non-limiting manner, in connection with FIGS. 1 to 5, wherein:

FIG. 1 illustrates schematically an embodiment of the method according to invention.

FIG. 2 illustrates one example of a glazing obtained according to the invention.

FIG. 3 illustrates schematically another embodiment of the method according to invention.

FIG. 4 illustrates schematically another embodiment of the method according to invention.

FIG. 5 illustrates schematically another embodiment of the method according to invention.

FIGS. 1 and 3 to 5 represent a schematic cross-section of one part of the glass sheets and of the elements deposited on the glass sheets, near the periphery thereof, during the steps of the method. The various elements are obviously not represented at scale, so as to be able to visualize them.

The first glass sheet 10 coated with the stack of thin layers 12 is provided in step a, then a part of stack 12 is coated by a washable dissolving layer 14, in particular through screen printing (step b), in a zone 13 called "zone to be cleared".

In step c, the first glass sheet undergoes a pre-firing treatment causing in zone 16 a dissolution of stack 12 by the washable dissolving layer 14. After washing (step d), which causes the removal of the washable dissolving layer 14, the first glass sheet 10 presents a bare glass surface in the cleared zone 17.

In step e, an opaque mineral layer 16, such as a coating of enamel or a layer of silicate paint, is deposited on the cleared zone 17.

An additional glass sheet 20, here provided with an additional stack of thin layers 22, is then placed on the first glass sheet 10, the whole then being curved (step f). The view shown being only that of the end of the glass sheet, the curving is not shown here.

In step g, the first glass sheet 10 coated with the stack of thin layers 12 and the additional glass sheet 20 coated with the additional stack 22 are assembled using a lamination interlayer 30. The diagram here represents each of the separate elements, in an exploded view. Stack 12, turned towards the lamination interlayer, is positioned in the final glazing on face 2.

FIG. 2 represents an example of a glazing according to the invention, here a windshield, seen face-on. The opaque zone formed by the opaque mineral layer 16 is presented in the form of a peripheral strip whose width depends on the position on the glazing. Here the strip has a low width in the lateral zones, a high width in the lower zone, and a variable width in the upper zone, the opaque strip dissimulating in the upper central zone the means of positioning the central rear view mirror and housing in this zone transmission windows for sensors and cameras, such as rain or light sensors or cameras to aid driving or lidars.

FIGS. 3 to 5 illustrate other configurations than FIG. 1, wherein the opaque zone formed by the opaque mineral layer 16 and the stack of thin layers 12 do not correspond exactly.

In FIG. 3, a slight space t exists between the two zones, typically at most 1 mm, even at most 0.5 mm.

In FIG. 4 on the contrary, a coating r (or overlap) is provided. In a preferred embodiment of the invention, the coating exists during the step e of depositing enamel, but can subsequently be removed because the enamel used can dissolve the underlying stack of thin layers during curving or a pre-firing e1.

In FIG. 5, this coating is made less visible thanks to a graded dotted pattern 18 obtained during the screen printing of the opaque mineral layer.

The examples were realized as follows.

A glass sheet 2.1 mm thick, previously coated by cathode sputtering with a stack of thin layers comprising two layers of silver protected by layers of zinc oxide, layers of silicon nitride and NiCr blockers, was coated, on one peripheral strip, by screen printing with a washable dissolving layer with a wet thickness of 25 μm. The deposited composition was a sodium phosphate based paste marketed by the company Ferro with reference TDF9283.

After drying (between 100 and 250° C., 1 to 2 minutes) a step of pre-firing at about 600° C. allowed the washable dissolving layer to dissolve the stack of thin layers. A step of washing then made it possible to remove the washable dissolving layer.

An opaque mineral layer was then deposited by screen printing.

In a first series of tests, the opaque mineral layer was a silicate paint (provided by ICD under reference OPH-CG1-231 black) with an overlap or a space of bare glass as shown in FIGS. 3 and 4. The thickness deposited was 25 μm wet, to give about 8 μm after firing. A drying at about 150° C. was done after deposit.

In a second series of tests, the opaque mineral layer was an enamel coating based on bismuth and zinc borosilicate capable of dissolving the stack of thin layers. The deposit was made with an overlap (as illustrated in FIG. 4), so as to ensure in the end a perfect connection with the zone coated by the stack of thin layers. A step of pre-firing at about 600° C. was performed after deposit.

After pairing with an additional glass sheet made of silico-sodo-calcium glass provided on face 4 with a stack comprising a layer of ITO, the whole was curved at more than 600° C. for 350 to 500 seconds. The two glass sheets were then laminated together using a PVB interlayer.

After assembly, the appearance, more particularly the black color viewed from face 1, was assessed by measuring the lightness L* in reflection (illuminant D65, reference observer 10°). The measured value of L* was less than 5.

The invention claimed is:

1. A method for producing a curved laminated glazing, comprising:
   a. providing a first glass sheet, coated on at least one part of one of its faces with a stack of layers,
   b. depositing, on one part of the surface of the stack of layers, in a zone to be cleared, a washable dissolving layer, the washable dissolving layer being a mineral layer comprising an alkaline phosphate,
   c. pre-firing, at a temperature between 150° C. and 700° C., the first glass sheet comprising in said zone to be cleared said washable dissolving layer, such that, after said pre-firing, the stack of layers located under the washable dissolving layer is dissolved by said washable dissolving layer,
   d. removing the washable dissolving layer by washing, creating a cleared zone,
   e. depositing, at least on one part of the cleared zone, an opaque mineral layer,
   f. curving the first glass sheet and an additional glass sheet, together or separately,
   g. laminating said first glass sheet with the additional glass sheet using a lamination interlayer, the stack of layers being turned towards the lamination interlayer.

2. The method according to claim 1, wherein the stack of layers comprises at least one functional layer.

3. The method according to claim 1, wherein the washable dissolving layer is deposited from a fluid composition.

4. The method according to claim 3, wherein the washable dissolving layer is deposited by screen printing.

5. The method according to claim 1, wherein a thickness of the washable dissolving layer is comprised between 5 and 50 μm.

6. The method according to claim 1, wherein step b is immediately followed by a drying step.

7. The method according to claim 1, wherein the cleared zone and the opaque mineral layer form a strip around the periphery of the first glass sheet.

8. The method according to claim 1, wherein the opaque mineral layer is black.

9. The method according to claim 1, wherein the deposit of the opaque mineral layer is achieved by depositing an enamel composition comprising a glass frit and pigments.

10. The method according to claim 1, wherein the deposit of the opaque mineral layer is achieved by depositing an aqueous paint composition comprising pigments and an aqueous solution of alkaline silicate.

11. The method according to claim 1, wherein the opaque mineral layer is deposited by screen printing or by digital printing techniques.

12. The method according to claim 1, wherein the lamination interlayer comprises at least one sheet of polyvinylacetal.

13. The method according to claim 1, wherein the additional glass sheet bears, on the face opposite the face turned to the lamination interlayer, an additional stack of layers.

14. The method according to claim 1, wherein the curved laminated glazing is a windshield or a roof of a motor vehicle.

15. The method according to claim 2, wherein the at least one functional layer is an electro-conducting functional layer that is a metallic layer made of silver or niobium or a transparent conductive oxide made of indium or tin oxide, both optionally doped.

16. The method according to claim 3, wherein the fluid composition is a liquid or a paste.

17. The method according to claim 5, wherein the thickness of the washable dissolving layer is comprised between 10 and 40 μm.

18. The method according to claim 1, wherein the alkaline phosphate is sodium phosphate.

19. A method for producing a curved laminated glazing, comprising:
   a. providing a first glass sheet, coated on at least one part of one of its faces with a stack of layers,
   b. depositing, on one part of the surface of the stack of layers, in a zone to be cleared, a washable dissolving layer, the washable dissolving layer being a mineral layer comprising an alkaline phosphate,
   c. pre-firing, at a temperature between 550° C. and 700° C., the first glass sheet comprising in said zone to be cleared said washable dissolving layer, such that, after said pre-firing, the stack of layers located under the washable dissolving layer is dissolved by said washable dissolving layer,
   d. removing the washable dissolving layer by washing, creating a cleared zone,
   e. depositing, at least on one part of the cleared zone, an opaque mineral layer,
   f. curving the first glass sheet and an additional glass sheet, together or separately,
   g. laminating said first glass sheet with the additional glass sheet using a lamination interlayer, the stack of layers being turned towards the lamination interlayer.

* * * * *